(12) United States Patent
Eroglu et al.

(10) Patent No.: US 8,434,312 B2
(45) Date of Patent: May 7, 2013

(54) GAS TURBINE WITH IMPROVED PART LOAD EMISSIONS BEHAVIOR

(75) Inventors: Adnan Eroglu, Untersiggenthal (CH); Klaus Knapp, Gebenstorf (CH); Peter Flohr, Turgi (CH); Hans Peter Knöpfel, Dottikon (CH); Weiqun Geng, Dättwil (CH)

(73) Assignee: ALSTOM Technology Ltd., Baden (CH)

( * ) Notice: Subject to any disclaimer, the term of this patent is extended or adjusted under 35 U.S.C. 154(b) by 32 days.

(21) Appl. No.: 13/241,983

(22) Filed: Sep. 23, 2011

(65) Prior Publication Data

US 2012/0017601 A1    Jan. 26, 2012

Related U.S. Application Data

(63) Continuation of application No. PCT/EP2010/053171, filed on Mar. 12, 2010.

(30) Foreign Application Priority Data

Apr. 1, 2009  (CH) .......................................... 536/09

(51) Int. Cl.
*F02C 7/228*  (2006.01)
(52) U.S. Cl.
USPC ........................... 60/776; 60/39.281; 60/39.13
(58) Field of Classification Search .................... 60/772, 60/773, 776, 785, 794, 795, 806, 39.281, 60/39.23, 39.13
See application file for complete search history.

(56) References Cited

U.S. PATENT DOCUMENTS 6,945,053 B2 *  9/2005  Von Der Bank ................ 60/776

FOREIGN PATENT DOCUMENTS

| EP | 0646704 | 4/1995 |
|---|---|---|
| EP | 0646705 | 4/1995 |
| EP | 0718470 | 6/1996 |
| EP | 0921292 | 6/1999 |
| EP | 0974789 | 1/2000 |
| EP | 1531305 | 5/2005 |
| WO | WO2010/112318 | 10/2010 |

OTHER PUBLICATIONS

Search Report for Swiss Patent App. No. 00536/09 (Jul. 31, 2009).
International Search Report for PCT Patent App. No. PCT/EP2010/053171 (Sep. 10, 2010).

* cited by examiner

*Primary Examiner* — Phutthiwat Wongwian
*Assistant Examiner* — Karthik Subramanian
(74) *Attorney, Agent, or Firm* — Cermak Nakajima LLP; Adam J. Cermak

(57) ABSTRACT

In a method for the low-CO emissions part load operation of a gas turbine with sequential combustion, the air ratio ($\lambda$) of the operative burners (9) of the second combustor (15) is kept below a maximum air ratio ($\lambda_{max}$) at part load In order to reduce the maximum air ratio ($\lambda$), a series of modifications in the operating concept of the gas turbine are carried out individually or in combination. One modification is an opening of the row of variable compressor inlet guide vanes (14) before engaging the second combustor (15). For engaging the second combustor, the row of variable compressor inlet guide vanes (14) is quickly closed and fuel is introduced in a synchronized manner into the burner (9) of the second combustor (15). A further modification is the deactivating of individual burners (9) at part load.

17 Claims, 11 Drawing Sheets

GAS TURBINE WITH IMPROVED PART LOAD EMISSIONS BEHAVIOR

This application is a Continuation of, and claims priority under 35 U.S.C. §120 to, International application no. PCT/EP2010/053171, filed 12 Mar. 2010, and claims priority therethough under 35 U.S.C. §§119, 365 to Swiss application no. 00536/09, filed 1 Apr. 2009, the entireties of which are incorporated by reference herein.

BACKGROUND

1. Field of Endeavor

The invention relates to a method for operating a gas turbine with sequential combustion and low CO emissions.

2. Brief Description of the Related Art

Gas turbines with sequential combustion have been successful in commercial operation for some time now. In them, compressed air is combusted with fuel in a first combustor, and a first turbine, referred to as the high-pressure turbine, is exposed to admission of hot gases. The temperature of the hot gases which discharge from the high-pressure turbine is increased again in a second combustor as a result of renewed addition of fuel and its combustion, and a second turbine, which is referred to as the low-pressure turbine, is exposed to admission of these hot gases.

Compared with conventional gas turbines with only one combustor, they are characterized by the additional degree of freedom of a separate fuel control for the first and second combustors. This furthermore offers the possibility of first of all putting into operation only the first combustor and engaging the second combustor only in the case of higher load. This enables a flexible operating concept with good emissions behavior over a wide operating range of the gas turbine.

In recent years, the main focuses of development were the reduction of NOx emissions and higher part load efficiency. Gas turbines with sequential combustion, which are operated according to known methods, as are described in EP0718470, for example, have very low NOx emissions and can achieve excellent part load efficiency.

The aforementioned known operating concepts, however, at low part load, especially within the range of about 20% to 50% of the relative load, can lead to high CO (carbon monoxide) emissions.

These high CO emissions are typically created at low part load by the second combustor of a gas turbine with sequential combustion. Conventionally, the second combustor is ignited at low part load if the rows of variable compressor inlet guide vanes are closed and the hot gas temperature or turbine inlet temperature of the high-pressure turbine has reached an upper limit value. For ignition, the second combustor is supplied with a minimum fuel flow which is typically prespecified by the control characteristic of the fuel control valve. On account of the high exhaust temperature of the first turbine, self-ignition of the fuel flow which is introduced into the second combustor occurs. The fuel flow is increased via the load for load control. Providing the fuel flow is low, the temperature of the hot gases in the second combustor is not significantly increased. The reaction speed remains correspondingly relatively low and unburnt hydrocarbons and CO may occur on account of the short residence time in the combustor. These occur especially in the case of lean combustion, that is to say in the case of combustion with a high air ratio $\lambda$. The air ratio $\lambda$ is the ratio of air mass actually available for combustion to the at least required stoichiometric air mass. It is also referred to as air coefficient, air ratio number, or excess air.

Within the limits of a flexible power plant operation, however, the possibility of running for longer operating periods at low part load is increasingly also required. A longer operation at low part load can only be realized if the CO emissions also remain at a low level. Conventionally, a CO catalyst is used for reducing CO emissions. In addition to high acquisition costs, these lead to pressure losses in the exhaust gas system of the gas turbine and to forfeiture of power and efficiency which is associated therewith.

SUMMARY

One of numerous aspect of the present invention includes a method for operating a gas turbine with sequential combustion and a gas turbine with sequential combustion which enables operation with reduced CO emissions.

Another aspect includes a method for operating the gas turbine which keeps the air ratio $\lambda$ of the operating burner of the second combustor below a maximum air ratio $\lambda_{max}$ during part load operation. This method can include three new elements and also supplementing measures which can be implemented individually or in combination.

The maximum air ratio $\lambda_{max}$ in this case depends upon the CO emission limits which are to be observed, upon the design of the burner and of the combustor, and also upon the operating conditions, that is to say especially the burner inlet temperature.

A first element is a change in the principle of operation of the row of variable compressor inlet guide vanes which allows the second combustor to be put into operation only at higher part load. Starting from no-load operation, the row of variable compressor inlet guide vanes is already opened while only the first combustor is in operation. This allows loading up to a higher relative load before the second combustor has to be put in operation. If the row of variable compressor inlet guide vanes is opened and the hot gas temperature or turbine inlet temperature of the high-pressure turbine has reached a limit, the second combustor is supplied with fuel. In addition, the row of variable compressor inlet guide vanes is quickly closed. Closing of the row of variable compressor inlet guide vanes at constant turbine inlet temperature TIT of the high-pressure turbine, without countermeasures, would lead to a significant reduction of the relative power. In order to avoid this power reduction, the fuel mass flow, which is introduced into the second combustor, can be increased. The minimum load at which the second combustor is put into operation and the minimum fuel flow into the second combustor are therefore significantly increased. As a result, the minimum hot gas temperature of the second combustor is also increased, which reduces the air ratio $\lambda$ and therefore reduces the CO emissions.

In order to enable a uniform loading up, that is to say increasing the power of the gas turbine with practically constant gradients, the closing of the row of compressor inlet guide vanes at constant turbine inlet temperature TIT of the high-pressure turbine is carried out as soon as the row of variable compressor inlet guide vanes is opened and the hot gas temperature or turbine inlet temperature of the high-pressure turbine has reached the limit. In addition, the closing of the row of variable compressor inlet guide vanes is synchronized with the fuel supply to the second combustor, i.e. both processes are carried out at the same time or with a slight time delay in relation to each other.

At least one row of guide vanes, which is variable in its intake angle for controlling the intake mass flow of the compressor, is referred to as a row of variable compressor inlet guide vanes. In modern compressors, at least the front row of compressor guide vanes is typically variable. As a rule, two or more rows of guide vanes are variable.

The limit of the turbine inlet temperature TIT of the high-pressure turbine is also referred to as the part load limit. As a rule, it is lower than or equal to the full load limit, wherein the full load limit is the maximum turbine inlet temperature at full load.

When unloading, the process is reversed, that is to say with the row of variable compressor inlet guide vanes closed the load is lowered by reducing the fuel mass flow which is fed to the second combustor until a suitable limit value of the relative load, of the TIT of the low-pressure turbine, of the turbine exhaust temperature (TAT) of the low-pressure turbine, of the fuel mass flow to the second combustor, or of another suitable parameter or of a combination of parameters, is reached. As soon as this limit value is reached, the fuel feed to the second combustor is stopped and the row of variable compressor inlet guide vanes is quickly opened.

In order to avoid a repeated engaging and disengaging of the second combustor with the opening and closing of the row of variable compressor inlet guide vanes which are associated therewith, the limit value, which triggers the disengagement of the second combustor, can be provided with a hysteresis. That is to say, the relative load at which the second combustor is disengaged is lower than that at which it is engaged.

Ideally, the TIT of the first turbine is kept constant by the controller during the quick closing or opening of the row of variable compressor inlet guide vanes. In practice, however, as a result of the quick closing of the row of variable compressor inlet guide vanes and as a result of the engaging and disengaging of the second combustor, overswings of the TIT of the high-pressure turbine can occur. In order to avoid these, in one embodiment a pre-controlling of the fuel control valve of the first combustor is proposed. During the quick closing of the row of variable compressor inlet guide vanes, the fuel control valve of the first combustor is correspondingly closed to a small degree by the pre-controlling. Similarly, during the quick opening of the row of variable compressor inlet guide vanes, the fuel control valve is correspondingly opened to a small degree by the pre-controlling.

The second element for reducing the air ratio $\lambda$ is a change in the principle of operation by increasing the turbine exhaust temperature of the high-pressure turbine TAT1 and/or the turbine exhaust temperature of the low-pressure turbine TAT2 during part load operation. This increase allows opening of the row of variable compressor inlet guide vanes to be shifted to a higher load point.

Conventionally, the maximum turbine exhaust temperature of the second turbine is determined for the full load case and the gas turbine, and possibly the downstream waste heat boiler, are designed in accordance with this temperature. This leads to the maximum hot gas temperature of the second turbine not being limited by the TIT2 (turbine inlet temperature of the second turbine) during part load operation with the row of variable compressor inlet guide vanes closed, but by the TAT2 (turbine exhaust temperature of the second turbine). Since at part load with at least one row of variable compressor inlet guide vanes closed, the mass flow and therefore the pressure ratio across the turbine is reduced, the ratio of turbine inlet temperature to turbine exhaust temperature is also reduced. Correspondingly, with constant TAT2, the TIT2 is also reduced and in most cases lies considerably below the full load value. A proposed slight increase of the TAT2 beyond the full load limit, typically within the order of magnitude of 10° C. to 30° C., admittedly leads to an increase of the TIT2, but this remains below the full load value and can practically be achieved without service life losses, or without significant service life losses. Adaptations in the design or in the choice of material do not become necessary or can be limited typically to the exhaust gas side. For increasing the TIT2, the hot gas temperature is increased, which is realized by an increase of the fuel mass flow and a reduction of the air ratio $\lambda$ which is associated therewith. The CO emissions are correspondingly reduced.

A further possibility for reducing the air ratio $\lambda$ of the burner in operation is the deactivating of individual burners and redistribution of the fuel at constant TIT2.

In order to keep the TIT2 constant on average, the burner in operation has to be operated hotter in proportion to the number of deactivated burners. For this, the fuel feed is increased and therefore the local air ratio $\lambda$ is reduced.

A theoretic mixture temperature of the hot gases and all the cooling air mass flows according to ISO 2314/1989, for example, is used as the turbine inlet temperature. However, use can also be made of the hot gas temperature before entry into the turbine, or the so-called "firing temperature", or a mixture temperature downstream of the first turbine guide vanes, for example.

Starting from high load, in which all the burners of the second combustor are in operation, different modes of operation are possible in which burners are deactivated inversely proportionally to the load, for example.

For an operation which is optimized for CO emissions, in a gas turbine with a parting plane, a burner which is adjacent to the parting plane is typically deactivated first of all. In this case, the plane in which a casing is typically split into upper and lower halves is referred to as the parting plane. The respective casing halves are connected in the parting plane by a flange, for example.

Its adjacent burners are subsequently then deactivated or a burner which is adjacent to the parting plane on the opposite side of the combustor is deactivated and in alternating sequence the adjacent burners which alternate on the two sides of the combustor, starting from the parting plane, are deactivated.

A burner which is adjacent to the parting plane is preferably deactivated first of all since the parting plane of a gas turbine is typically not absolutely leakproof and in most cases a leakage flow leads to a slight cooling and dilution of the flammable gases and therefore to locally increased CO emissions. As a result of deactivating the burners which are adjacent to the parting plane, these local CO emissions are avoided.

As a compromise, it has to be accepted, however, that by deactivating individual burners at least two burners operate with cold, inoperative adjacent burners. Each limitation to a cold adjacent burner potentially leads to increased CO emissions, which is why the number of groups of cold burner is to be minimized. Depending upon the design of the gas turbine, especially upon the leakages in the region of the parting plane, an individual group of deactivated burners, two groups of deactivated burners which are arranged on both sides of the parting plane, or a large number of groups of deactivated burners, can be advantageous.

A further possibility for reducing the air ratio $\lambda$ is a controlled "staging". Homogenous combustion processes can lead to pulsations in annular combustors. These are typically avoided at high load by so-called "staging". Restricting the fuel feed to at least one burner is understood as staging. For this, a restrictor or another throttling element is fixedly installed in the fuel line of the at least one burner which is to be restricted. The air ratio $\lambda$ of the at least one restricted burner becomes greater in proportion to the reduced fuel quantity for all the operating states. At high load, this leads to a desired inhomogeneity in the annular combustor. At low load, this inhomogeneity, however, leads to an over-proportional increase of CO production of the at least one restricted burner. The combustion instabilities, which are to be avoided by staging, as a rule no longer occur at low load, or are negligibly small. In one exemplary embodiment, it is proposed, therefore, to carry out the restricting not by a fixed restrictor but by at least one control valve. This at least one control valve is opened at low load so that all the activated burners can be operated virtually homogenously with a low air ratio $\lambda$. At high load, the at least one control valve is throttled in order to realize the staging.

The at least one control valve can be arranged in the feed line of individual burners. Alternatively, the burners can also be assembled into at least two groups, each group having a control valve and a ring main for distribution of the fuel.

In a further embodiment, for reducing the air ratio $\lambda$ at part load, compressor exit air or compressor tapped air (also referred to as bleed air) is expanded and added to the intake air. This can be achieved, for example, by engaging a so-called "anti-icing system", in which air from the compressor plenum is added to the intake air for increasing the intake temperature. The tapping of compressor air leads to a reduction of the air quantity which flows through the combustor. Furthermore, the compressor work with regard to the overall power of the gas turbine is increased. In order to compensate for the increased power input of the compressor, the turbine power, and therefore the amount of fuel, must be increased. Both lead to a reduction of the air ratio $\lambda$ and therefore to a reduction of the CO emissions.

Further possibilities for reducing the CO emissions are opened up by controlling the cooling air mass flows and/or the cooling air temperature.

At part load, the TIT1, for example, can be reduced. In proportion to the reduced hot gas temperature, the hot gas components become cooler and the cooling capacity can be reduced by a reduction of the high-pressure cooling air mass flow and/or by an increase of the high-pressure cooling air temperature downstream of the cooling air cooler. In proportion to the reduced cooling capacity, cold strands or flow regions, which are created by cooling air and cooling air leakages, are reduced. Consequently, the temperature profile at the inlet into the second combustor becomes more homogenous. With the homogenous inlet profile, local cooling of the flame is avoided and therefore the CO emissions are reduced.

Correspondingly, at part load with reduced TIT2, the low-pressure cooling capacity can be reduced by a reduction of the low-pressure cooling air mass flow and/or by an increase of the low-pressure cooling air temperature downstream of the cooling air cooler. As a result of the reduced cooling capacity, cold regions in the combustor are directly alleviated, that is to say hot and cold strands relative to the hot gas temperature are reduced and CO emissions are correspondingly reduced.

Alternatively, depending upon the cooling air system, the low-pressure cooling air quantity can be increased. If a large part of the low-pressure cooling air is introduced into the second turbine, the air mass flow through the burners and combustor can be reduced as a result. The air ratio $\lambda$ is therefore reduced and a reduction of CO emissions can be achieved.

In order to be able to use the low-pressure cooling air system effectively as a bypass for the combustors, especially as a bypass for the second combustor, in one embodiment a division of the low-pressure cooling air system into one section for the second combustor and one section for the second turbine is proposed. In this case, the cooling air flow for at least one section of the system is constructed with control capability. Ideally, both sections of the system are controllable so that at part load the cooling air mass flow into the burners and into the combustor is reduced while at the same time the cooling air mass flow into the second turbine is increased.

This controlling of the cooling air system is typically carried out in dependence upon the load or relative load. Controlling in dependence upon the position of the front row of compressor inlet guide vanes, upon the compressor exit pressure, upon the TIT1, TIT2, or upon another suitable parameter, and also upon a combination of parameters, is also possible.

Instead of controlling the cooling air mass flows and/or cooling air temperature, controlling in dependence upon the same parameters or parameter combinations, for example, can also be used.

In a further embodiment, the fuel temperature to which the fuel is increased in a preheater is controlled as a function of the load. For reducing the CO part load emissions, the fuel temperature at part load is increased. As a result of increasing the fuel temperature, the reaction speed increases and the flame migrates upstream. This leads to a more stable flame with improved burnout and correspondingly reduced CO emissions.

This controlling of the fuel temperature is typically carried out in dependence upon the load or relative load. Controlling in dependence upon the position of the front row of compressor inlet guide vanes, upon the compressor exit pressure, upon the TIT1, TIT2, or upon another suitable parameter, and also upon a combination of parameters, is also possible.

Instead of controlling the fuel temperature, controlling in dependence upon the same parameters or parameter combinations, for example, can also be used.

In addition to methods, gas turbines useful for implementing the methods are included in yet further aspects of the invention. Depending upon the chosen method or combination of methods, the design of the gas turbine has to be adapted and/or the fuel distribution system and/or the cooling air system have to be adapted in order to ensure the feasibility of the method.

In order to enable the deactivation of individual burners at part load, provision is to be made for an individual on/off valve in at least one fuel line to at least one burner of the second combustor.

In order to realize a load-dependent staging, provision is to be made for a control valve in at least one fuel line to at least one burner of the second combustor. Alternatively, the fuel distribution system can be divided into at least sub-groups of burners with associated fuel distribution, wherein each sub-group includes a fuel control valve and also a fuel ring main for distribution of the fuel to the burners of the respective sub-group.

In order to enable opening of the row of variable compressor inlet guide vanes, a check of the surge margin of the high-pressure compressor and possibly an adjustment of the pressure build-up in the compressor, by re-staggering of the blading, for example, is to be carried out.

In order to realize an increase of the part load turbine exhaust temperature, at least the turbine exhaust and the exhaust gas lines are to be designed for a turbine exhaust temperature which is higher than the maximum full-load exhaust gas temperature.

In order to realize a controlling of the cooling air mass flows and temperatures, the cooling air cooler(s), is or are to be designed with control capability and control valves are to be provided for the cooling air systems. In addition, the systems within the scope of the broadened operating range are to be designed for increased cooling air flows and for an increased maximum temperature downstream of the cooler.

Further advantages and developments are to be gathered from the description and the attached drawings. All the explained advantages are applicable not only in the respectively specified combinations, but also in other combinations or alone without departing from the scope of the invention.

One embodiment is characterized, for example, by a determination of different components for reducing the locally occurring air ratio $\lambda$. All the components of a gas turbine lie within the range of permissible tolerances. These tolerances lead to slightly different geometries and characteristics for each component. This especially also leads to different pressure losses and flow rates during operation. The tolerances are selected so that they have practically no influence upon the operating behavior during normal operation, especially at high part load and full load. At part load with a high air ratio $\lambda$, the combustor, however, is operated under conditions in which even small disturbances can have a significant influence upon the CO emissions. If, for example, a fuel lance with a low flow coefficient is installed in a burner with large cross sectional area, this combination can lead to an increase of the local air ratio $\lambda$, which leads to a locally increased production of CO. In order to avoid this, a matching of components for the reduction of the locally occurring air ratio $\lambda$ is proposed. For this, the geometries and/or flow coefficients of the various components are measured and components with high flow rates and components with low flow rates are combined inside the second combustor.

A fuel lance is one example for a fuel feed into a burner of a second combustor. This is specified by way of example here and further on. The exemplary embodiments apply just the same to other types of fuel feed, such as pipes or profiles with fuel nozzles.

A typical example is the installation of fuel lances with high flow rate in burners with large cross section and correspondingly low pressure loss.

A further optimization possibility is offered by the matching of the second combustor to the first combustor. In this case, as a rule a component with a high flow rate in the first combustor is combined with a component with low flow rate in the second combustor.

For example, a burner lance with a low flow rate is arranged downstream of a burner of the first combustor which has a high fuel flow rate. The locally high flow rate in the first combustor leads to a locally high exit temperature from the first combustor and therefore to a locally increased inlet temperature in the upstream-disposed burners of the second combustor. In proportion to the increased inlet temperature for this burner, the reaction speed of fuel which is injected into it is higher than on average to all the burners. Therefore, it can be operated with a locally higher maximum air ratio $\lambda_{max}$. A lance with a low flow coefficient can be installed at this position for matching to the first combustor.

BRIEF DESCRIPTION OF THE DRAWINGS

Exemplary embodiments of the invention are shown schematically in FIGS. 1 to 11.

Schematically, in the drawings.

DETAILED DESCRIPTION OF EXEMPLARY EMBODIMENTS

Figure 1:
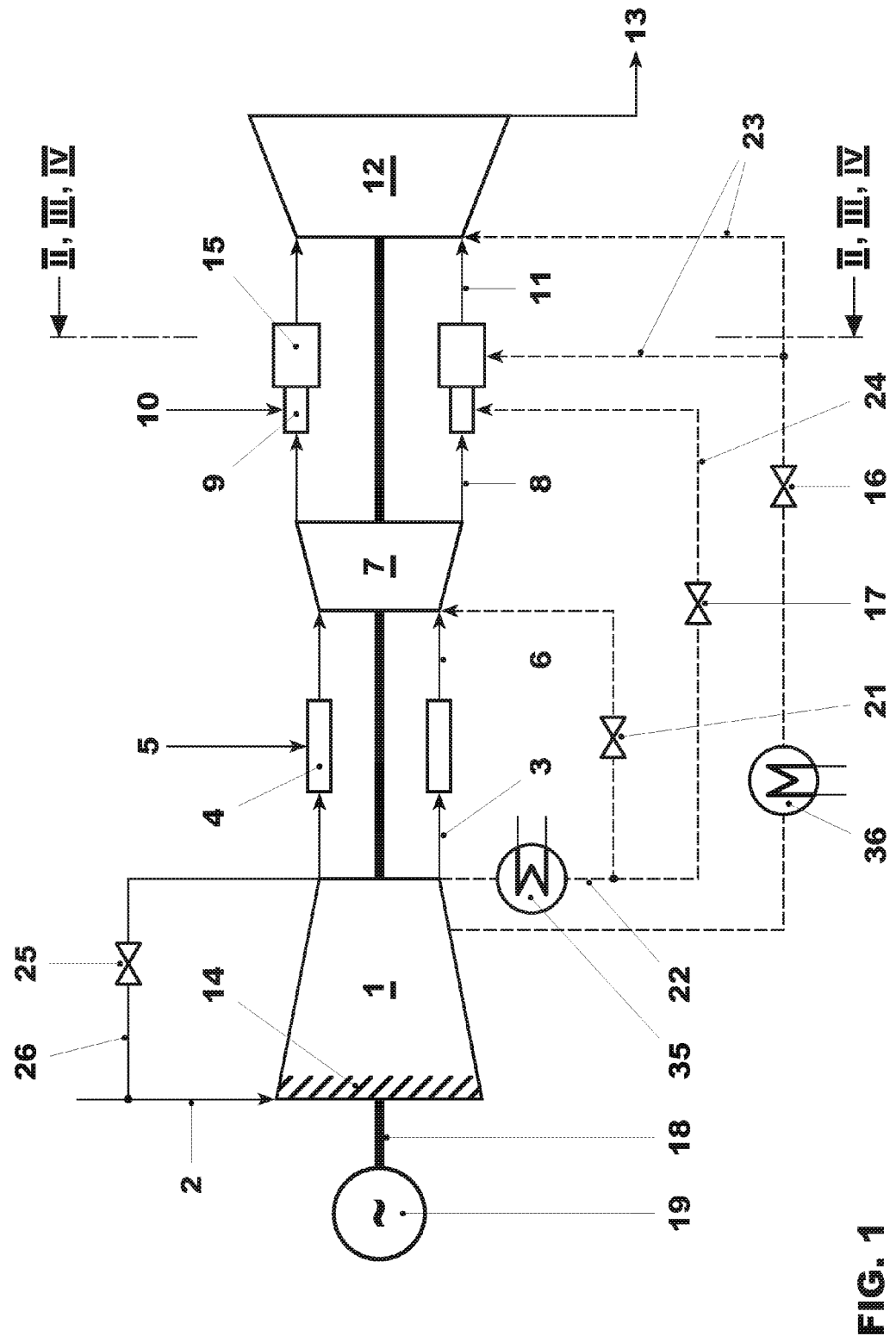
FIG. 1 shows a gas turbine with sequential combustion.

FIG. 1 shows a gas turbine with sequential combustion useful for implementing methods as described herein. The gas turbine includes a compressor 1, a first combustor 4, a first turbine 7, a second combustor 15, and a second turbine 12. Typically, it includes a generator 19 which, at the cold end of the gas turbine, that is to say at the compressor 1, is coupled to a shaft 18 of the gas turbine.

A fuel, gas, or oil is introduced via a fuel feed 5 into the first combustor 4, mixed with air which is compressed in the compressor 1, and combusted. The hot gases 6 are partially expanded in the subsequent first turbine 7, performing work.

As soon as the second combustor is in operation, additional fuel, via a fuel feed 10, is added to the partially expanded gases 8 in burners 9 of the second combustor 15 and combusted in the second combustor 15. The hot gases 11 are expanded in the subsequent second turbine 12, performing work. The exhaust gases 13 can be beneficially fed to a waste heat boiler of a combined cycle power plant or to another waste heat application.

For controlling the intake mass flow, the compressor 1 has at least one row of variable compressor inlet guide vanes 14.

In order to be able to increase the temperature of the intake air 2, provision is made for an anti-icing line 26 through which some of the compressed air 3 can be added to the intake air 2. For control, provision is made for an anti-icing control valve 25. This is usually engaged on cold days with high relative air moisture in the ambient air in order to forestall a risk of icing of the compressor.

Some of the compressed air 3 is tapped off as high-pressure cooling air 22, recooled via a high-pressure cooling air cooler 35 and fed as cooling air 22 to the first combustor 4 (cooling air line is not shown) and to the first turbine.

The mass flow of the high-pressure cooling air 22, which is fed to the high-pressure turbine 7, can be controlled by a high-pressure cooling air control valve 21 in the example.

Some of the high-pressure cooling air 22 is fed as so-called carrier air 24 to the burner lances of the burners 9 of the second combustor 15. The mass flow of carrier air 24 can be controlled by a carrier-air control valve 17.

Some of the air is tapped off, partially compressed, from the compressor 1, recooled via a low-pressure cooling air cooler 36 and fed as cooling air 23 to the second combustor 15 and to the second turbine 12. The mass flow of cooling air 23 can be controlled by a cooling-air control valve 16 in the example.

Figure 2:
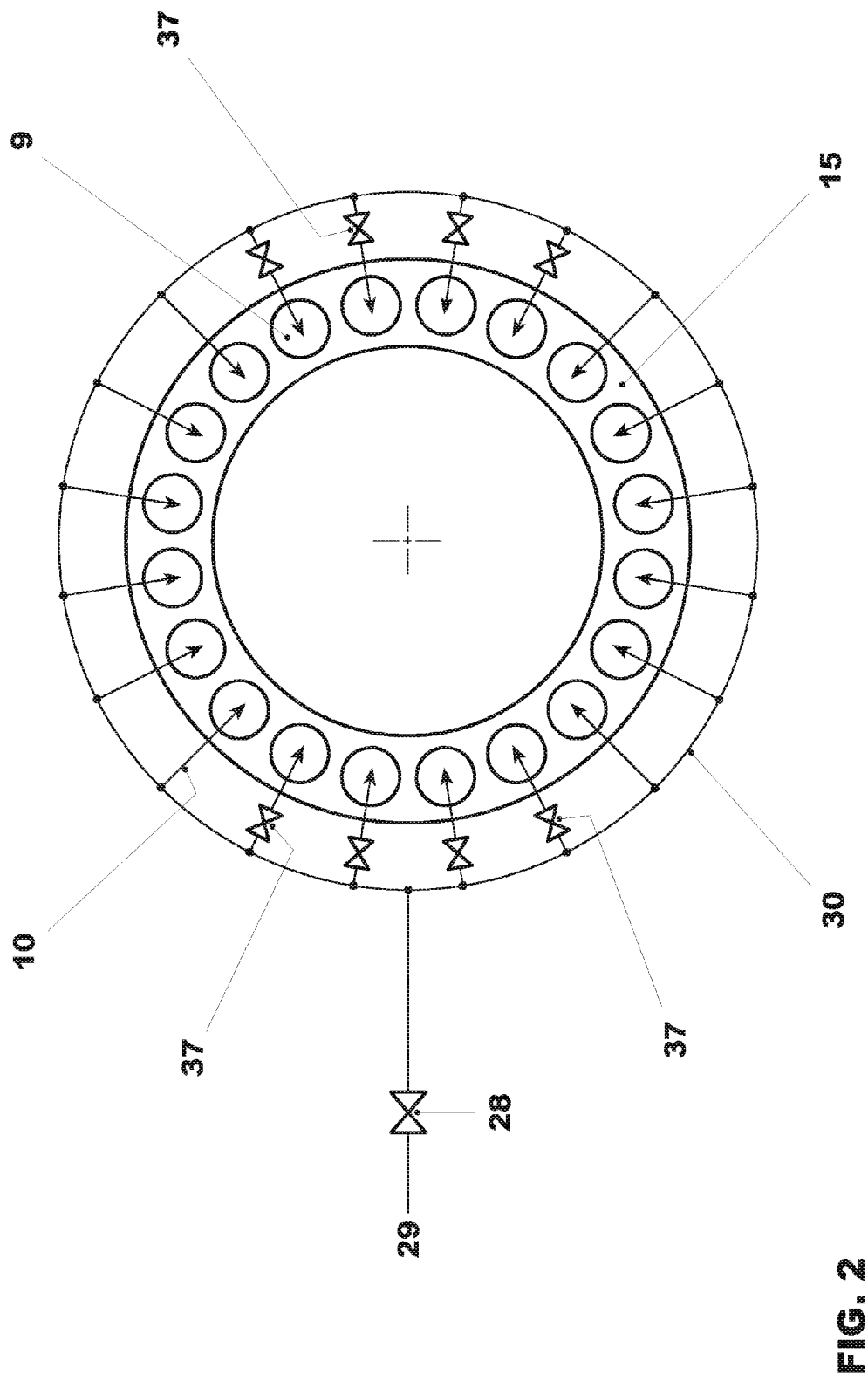
FIG. 2 shows a section through the second combustor of a gas turbine with sequential combustion and also the fuel distribution system with a fuel ring main and eight individual on/off valves for the restricting of eight burners.
Figure 3:
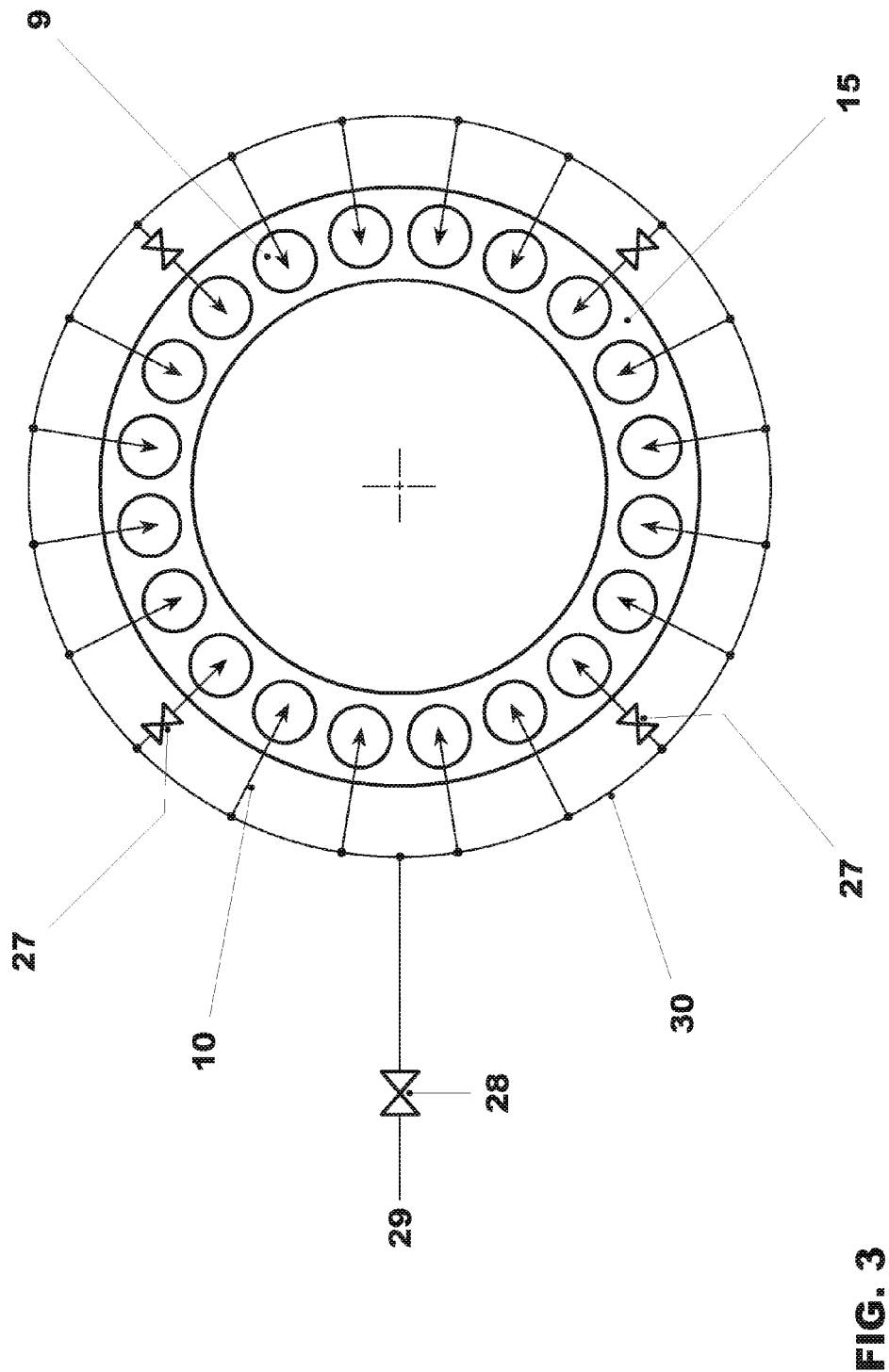
FIG. 3 shows a section through the second combustor of a gas turbine with sequential combustion and also the fuel distribution system with a fuel ring main and four individual control valves for controlling the fuel flow of four burners.

The combustors are constructed as annular combustors, for example, with a large number of individual burners 9, as is shown in FIGS. 2 and 3 by way of example of the second combustor 15. Each of these burners 9 is supplied with fuel via a fuel distribution system and a fuel feed 10.

FIG. 2 shows a section through the second combustor 15 with burners 9 of a gas turbine with sequential combustion, and also the fuel distribution system with a fuel ring main 30 and eight individual on/off valves 37 for deactivating eight burners 9. By closing individual on/off valves 37, the fuel feed to individual burners 9 is stopped and this is distributed to the remaining burners, wherein the overall fuel mass flow is controlled via a control valve 28. As a result, the air ratio λ of the burners 9 in operation is reduced.

FIG. 3 shows a section through the second combustor 15 and also a fuel distribution system with a fuel ring main 30 and fuel feeds 10 to the individual burners 9. In the example, four burners 9 are provided with individual control valves 27 for controlling the fuel flow in the fuel feeds 10 to the respective burners 9. The overall fuel mass flow is controlled via a control valve 28. The separate controlling of the fuel mass flow to the four burners 9 with individual control valves 27 allows staging. The four individual control valves are fully opened at low part load so that fuel is introduced evenly into all the burners 9 of the second combustor 15, so that all the burners 9 are operated with the same air ratio λ for minimizing the CO emissions. With increasing relative load, particularly if, for example, above 70% relative load increased pulsations can occur, the individual control valves 27 are slightly closed in order to realize a staging and therefore to stabilize the combustion. In this case, the air ratio λ of the burner 9 which is supplied via the slightly closed individual control valves 27 is increased. This, however, at high load is non-critical with regard to the CO emissions.

Figure 4:
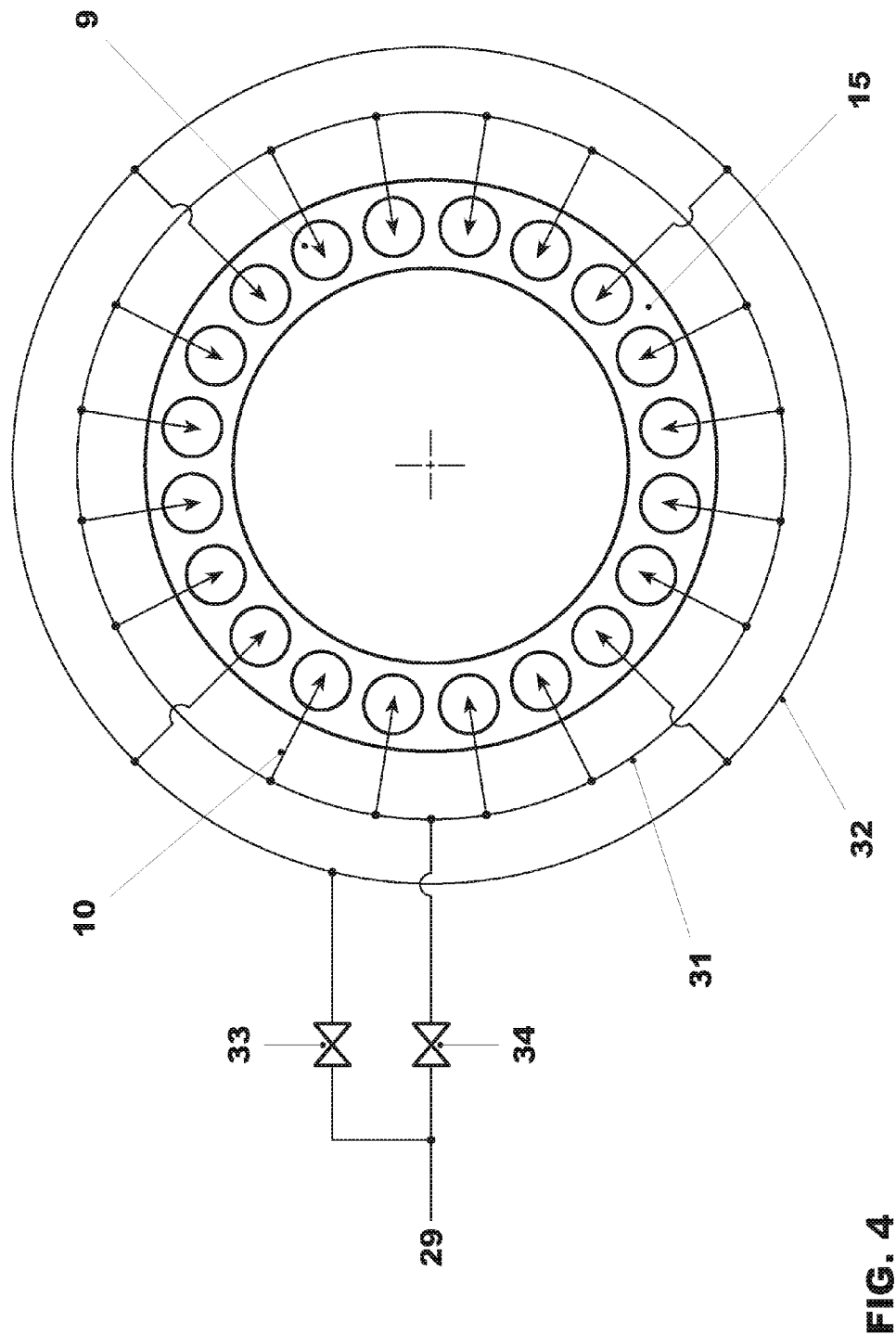
FIG. 4 shows a section through the second combustor of a gas turbine with sequential combustion and also the fuel distribution system with two separately controllable subgroups and two fuel ring mains.

FIG. 4 shows a section through the second combustor 15 of a gas turbine with sequential combustion, and also the fuel distribution system with two separately controllable sub-groups of burners. These have in each case a fuel ring main for a first sub-group 31 and a fuel ring main for a second sub-group 32 and the associated fuel feeds 10. For the independent control of the fuel quantity of both sub-systems, provision is made for a fuel control valve for the first sub-group 33 and a fuel control valve for the second sub-group 34.

The two control valves for the first and the second sub-groups 33, 34 are controlled at low part load so that the fuel mass flow per burner is the same.

As a result, fuel is introduced evenly into all the burners 9 of the second combustor 15 so that all the burners 9 are operated with the same air ratio λ for minimizing the CO emissions. With increasing relative load, especially if, for example, above 70% relative load increased pulsations occur, the control valve of the first sub-group 33 is not opened as wide as the control valve of the second sub-group 34 in order to realize a staging and therefore to stabilize the combustion.

Alternatively, the control valve of the first sub-group 33 can be connected downstream of the second control valve 34. In this case, similar to the example from FIG. 3, at part load the control valve of the first sub-group 33 is to be completely opened and at high part load is to be restricted in order to then realize a staging. The overall fuel mass flow is then controlled via the control valve 34. In the event that the fuel is a liquid fuel, such as oil, water injection becomes necessary for reducing the NOx emissions, depending upon the type of burner. This is carried out similarly to the fuel supply, for example, and provision is to be made for corresponding lines and control systems.

In the case of so-called dual-fuel gas turbines, which can be operated both with a liquid fuel, such as oil, and with a combustible gas, such as natural gas, separate fuel distribution systems are to be provided for each fuel.

Figure 5:
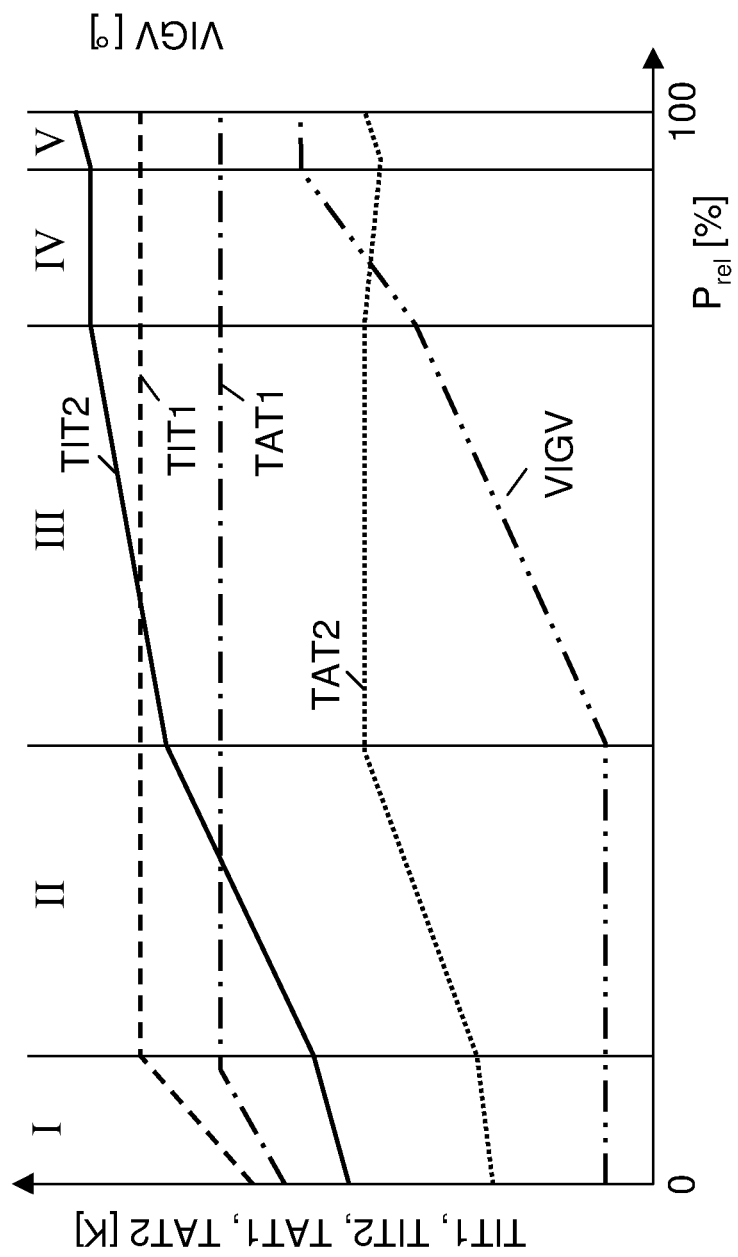
FIG. 5 shows a conventional method for controlling a gas turbine with sequential combustion.

FIG. 5 shows a conventional method for controlling a gas turbine with sequential combustion. Starting from no-load operation, that is to say from a relative load $P_{rel}$ of 0%, the gas turbine is loaded up to full load, that is to say to a relative load $P_{rel}$ of 100%. At 0% $P_{rel}$, the row of variable compressor inlet guide vanes is closed, that is to say is adjusted to a minimum opening angle.

The first combustor is ignited, which leads to a turbine inlet temperature TIT1 of the first turbine 7 and to a corresponding turbine exhaust temperature TAT1. The second combustor is not yet in operation so that no heating of the gases in the second combustor takes place. The temperature TAT1 of the gases which discharge from the first turbine 7 is reduced to the turbine inlet temperature TIT2 of the second turbine 12 as a result of the combustor cooling and also in consideration of the low-pressure turbine cooling. The expanded gases discharge from the second turbine 12 with a temperature TAT2.

In one phase I of the method, starting from 0% $P_{rel}$, for power increase the TIT1 is first increased to a TIT1 limit. With increasing TIT1, the exhaust temperature TAT1 and the temperatures TIT2 and TAT2 of the subsequent second turbine 12 also increase.

In order to further increase the power after reaching the TIT1 limit, at the start of phase II the second combustor 15 is ignited and the fuel feed 10 to the burners 9 of the second combustor is increased in proportion to the load. The TIT1 and TAT2 increase over load in phase II correspondingly with a steep gradient until a first limit of the TAT2 is reached. Conventionally, the TAT2 limit is identical to a TAT2 full-load limit.

In order to further increase the power after reaching the TAT2 limit, in a phase III of the method the row of variable compressor inlet guide vanes 14 is opened in order to control the power by increasing the intake mass flow. The pressure ratio of the second turbine 12 increases in proportion to the intake mass flow, which is why at constant TAT2 the TIT2 increases further over the relative load $P_{rel}$ until a first TIT2 limit is reached.

In order to further increase the relative load $P_{rel}$ after reaching the first TIT2 limit, in a phase IV of the method the row of variable compressor inlet guide vanes 14 is opened further at constant TIT2 until it reaches the maximum opened position.

In the example which is shown, in a phase V of the method, with a constant position of the row of variable compressor inlet guide vanes 14, the TIT2 is increased from the first TIT2 limit to a second TIT2 limit until 100% $P_{rel}$ is reached.

Figure 6:
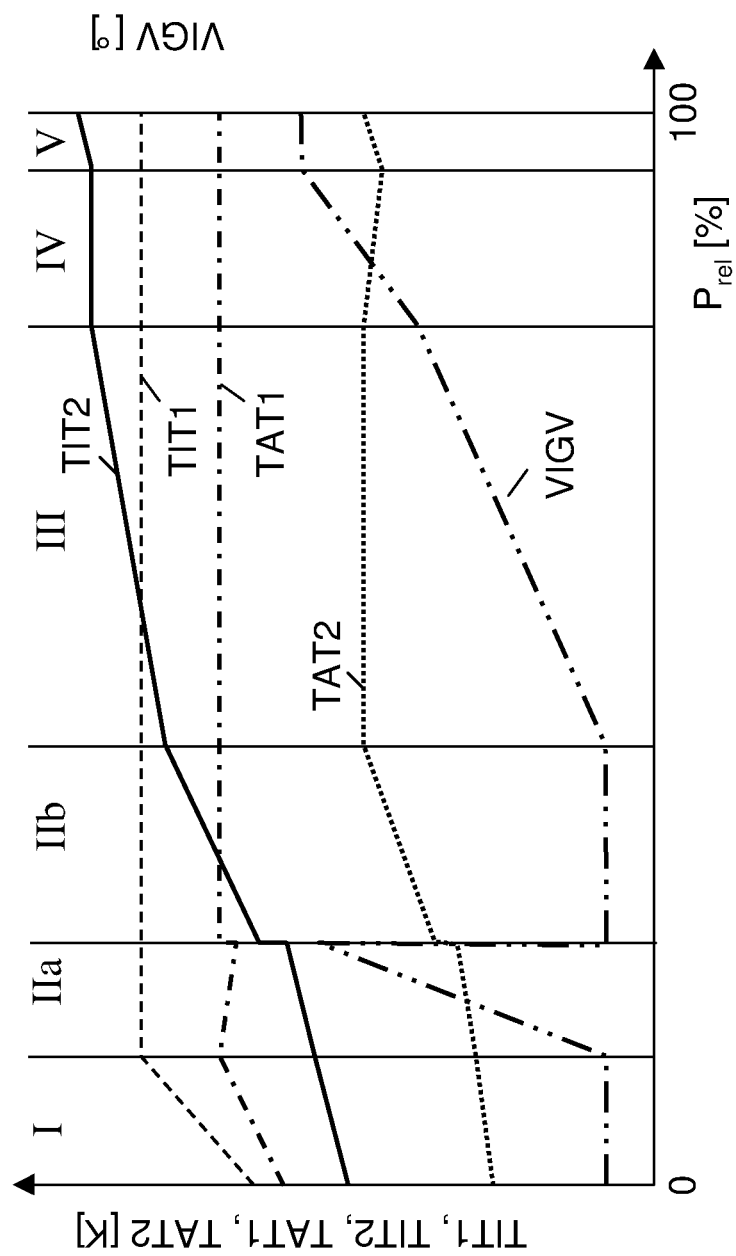
FIG. 6 shows a method for controlling a gas turbine with sequential combustion, in which during loading-up during operation with only the first combustor, the row of variable compressor inlet guide vanes is opened until it is closed abruptly upon engaging the second combustor.

FIG. 6 shows a method for controlling a gas turbine with sequential combustion, in which, compared with the method which is shown in FIG. 5, phase II has been modified: phase II in this case is split into two parts. As soon as the limit of the TIT1 at the end of phase I is reached, the load is increased in a phase IIa by the row of variable compressor inlet guide vanes 14 being opened. The second combustor 15 is not yet in operation during phase IIa. As soon as the row of variable compressor inlet guide vanes 14 has reached the open position at the end of phase IIa, the second combustor 15 is engaged and the row of variable compressor inlet guide vanes 14 is quickly closed. The fuel mass flow, which is introduced into the second combustor 15, is increased synchronously with the closing of the row of variable compressor inlet guide vanes 14. As a result, the second combustor is operated in steady state mode only at significantly higher load with significantly increased fuel mass flow and significantly increased TIT2. Since the intake mass flow, as soon as the second combustor is in steady-state operation, is consistently the minimum flow, the air ratio λ is significantly reduced and therefore the CO emissions are reduced. In phase IIb, the power is increased by increasing the TIT2 until reaching the TAT2 limit, similar to the method which is described for phase II. During the fast closing of the row of variable compressor inlet guide vanes 14, increased CO emissions may occur, which is why these are run in with an angular speed which is as high as possible. The angular speed on the one hand is restricted by the limits of the actuating elements of the row of variable compressor inlet guide vanes 14, and on the other hand load fluctuations and problems in controlling the turbine inlet temperatures may occur in the case of excessively fast closing. Also, if the actuating elements allow closing of the row of variable compressor inlet guide vanes 14 within a few seconds, the row of variable compressor inlet guide vanes 14 is closed within a time interval of a few minutes, for example, preferably within an interval of less than half a minute.

Figure 7:
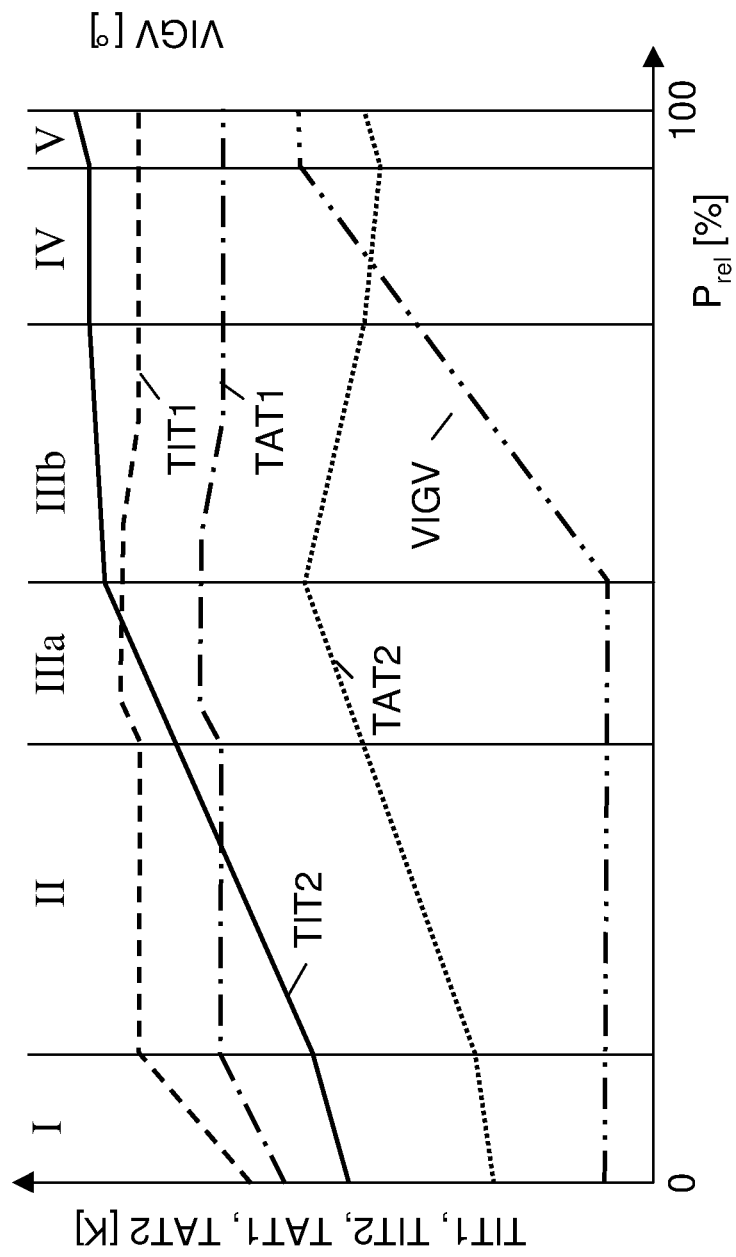
FIG. 7 shows a method for controlling a gas turbine with sequential combustion, in which during loading-up after engaging the second combustor, the TAT limits are increased beyond the full-load limit.

FIG. 7 shows a method for controlling a gas turbine with sequential combustion, in which, compared with the method which is shown in FIG. 5, phase III has been modified. Two modifications are represented in FIG. 7.

The first modification of phase III is the increasing of the TAT2 limit to a second limit which is higher than the TAT2 full-load limit. This allows a further increasing of the TIT2 until the second TAT2 limit is reached. In this case, the row of variable compressor inlet guide vanes 14 remains closed until the end of phase IIIa. Owing to the fact that the row of variable compressor inlet guide vanes 14 remains closed and the fuel mass flow increases with the TIT2, the air ratio λ is significantly reduced and therefore the CO part load emissions are reduced. In phase IIIb, the TAT2 limit is reduced in proportion to load until, at the end of the phase, the first TAT2 limit is reached. In order to increase the power, despite falling TAT2, the row of variable compressor inlet guide vanes 14 is opened with a steep gradient. The mass flow, and therefore the pressure ratio across the second turbine 12, increases in proportion to the opening of the row of variable compressor inlet guide vanes 14. With the pressure ratio, the temperature ratio of TIT2 to TAT2 increases so that, despite falling TAT2, the TIT2 is increased further until at the end of phase IIIb it reaches the first TIT2 limit.

The second modification which is shown in FIG. 7 is an increasing of TIT1 and TAT1 at the start of phase IIIa. The increasing is shown only by way of example during phase III. It is independent of transition points of the method or of the phases. It can be carried out in each CO emissions-critical part load range. The air ratio λ is not directly influenced in this case. The minimum air ratio $\lambda_{min}$ for achieving low-emissions combustion is dependent upon the boundary conditions of the combustion. By increasing the TAT1, these boundary conditions are improved. By increasing the TAT1, the temperature and reaction speed in the second combustor 15 increase, as a result of which burnout is improved and CO emissions are reduced.

Figure 8:
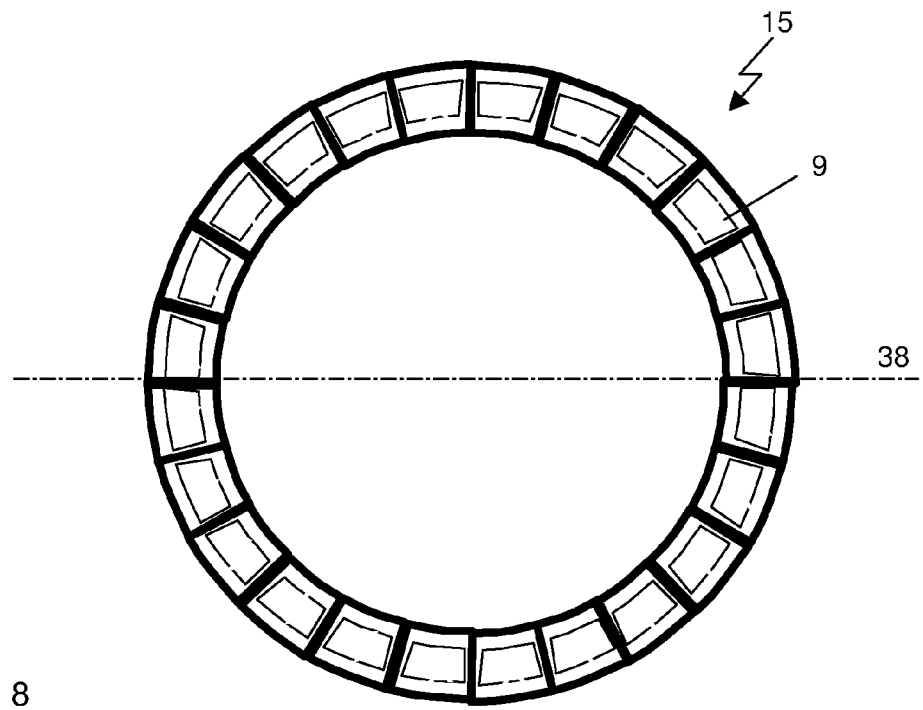
FIG. 8 shows a cross section through the second combustor of a gas turbine with sequential combustion, in which all the burners are in operation.

FIG. 8 shows a schematic cross section through the second combustor 15 of a gas turbine with sequential combustion, in which all the burners 9 are in operation. They are identified as being in operation by an x in each case.

Figure 8A:
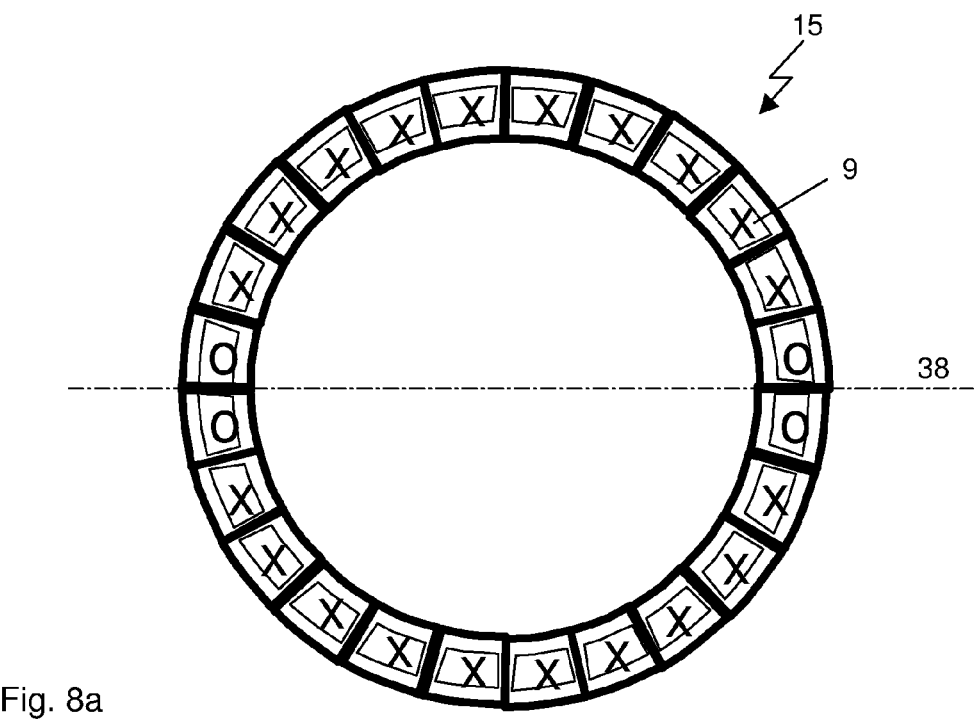
FIG. 8a shows a cross section through the second combustor of a gas turbine with sequential combustion, in which on the left and right in each case the burners which are adjacent to the parting plane are deactivated and the remaining burners are in operation.

FIG. 8a shows a cross section through the second combustor 15 of a gas turbine with sequential combustion, in which on the left and right in each case the burners 9 which are adjacent to the parting plane 38 are deactivated and the remaining burners 9 are in operation. The deactivated burners 9 are identified as being inoperative by an 'o'.

Figure 8B:
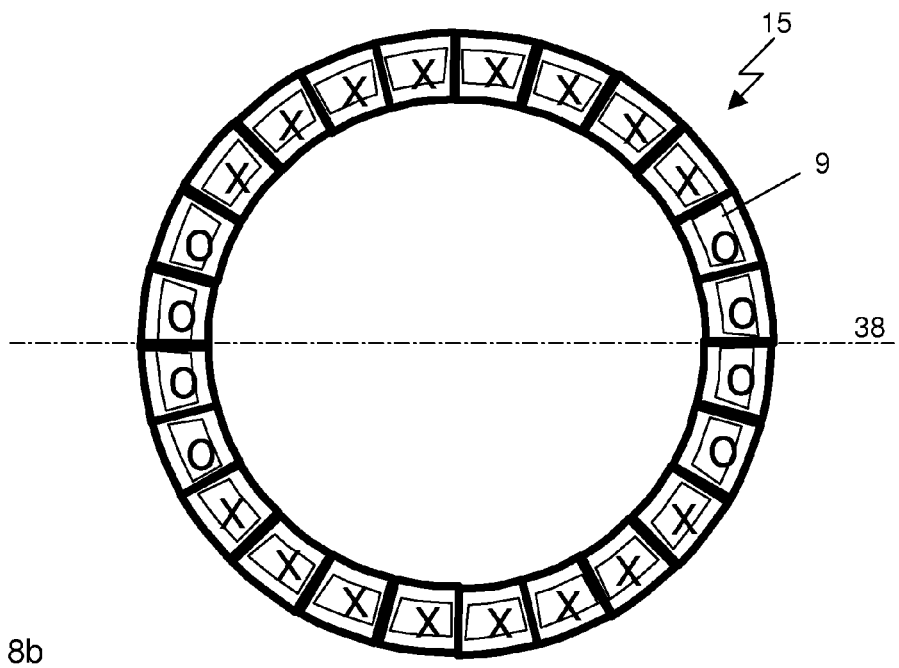
FIG. 8b shows a cross section through the second combustor of a gas turbine with sequential combustion, in which on the left and right in each case two burners which are adjacent to the parting plane are deactivated and the remaining burners are in operation.

FIG. 8b shows a cross section through the second combustor 15 of a gas turbine with sequential combustion, in which on the left and right in each case two burners 9 which are adjacent to the parting plane 38 are deactivated and the remaining burners 9 are in operation.

For activating the individual burners in FIGS. 8a and 8b, individual on/off valves, as shown in FIG. 2, for example, can be provided in the fuel feeds 10 to the individual burners 9. In one embodiment of the method, at high relative load $P_{rel}$ all the burners 9 are in operation. With lowering of the load below a limit value of $P_{rel}$, the burners 9 which are adjacent to the parting plane 38 are deactivated first of all, corresponding to FIG. 8a.

After a further lowering of the load below a lower limit value of $P_{rel}$, the burners 9 which are two positions distant from the parting plane 38 are additionally also deactivated, corresponding to FIG. 8b.

Figure 9A:
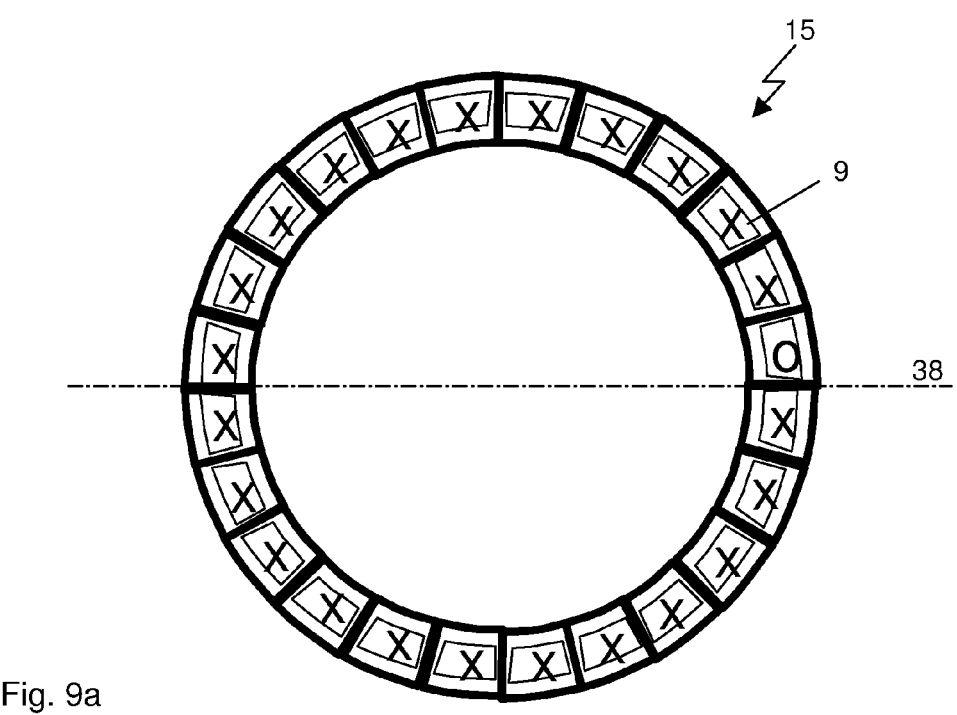
FIG. 9a shows a cross section through the second combustor of a gas turbine with sequential combustion, in which on the right a burner which is adjacent to the parting plane is deactivated and the remaining burners are in operation.

FIG. 9a shows a cross section through the second combustor 15 of a gas turbine with sequential combustion, in which on the right a burner 9 which is adjacent to the parting plane 38 is deactivated and the remaining burners 9 are in operation.

Figure 9B:
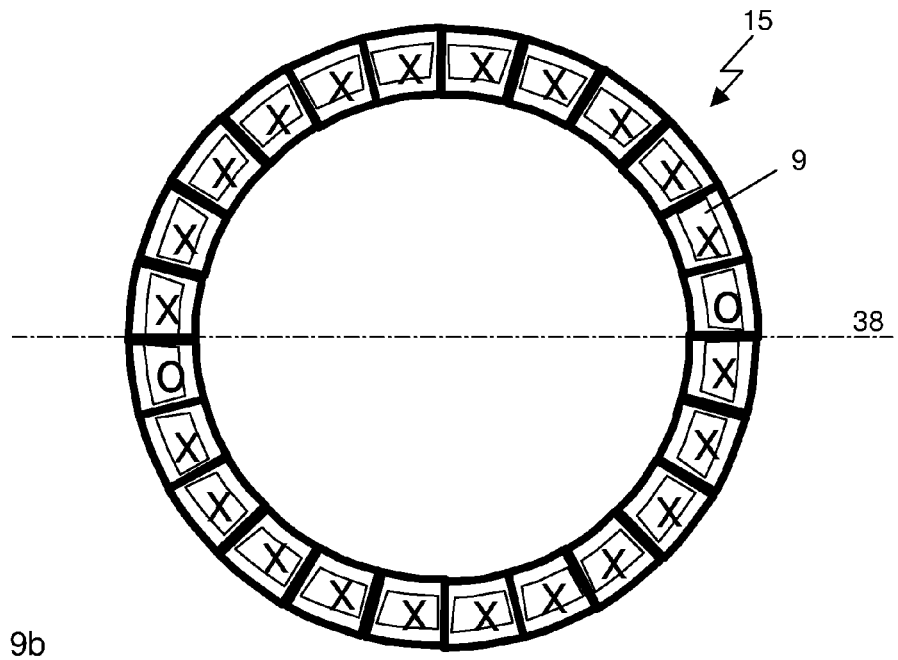
FIG. 9b shows a cross section through the second combustor of a gas turbine with sequential combustion, in which on the left and right in each case a burner which is adjacent to the parting plane is deactivated and the remaining burners are in operation.

FIG. 9b shows a cross section through the second combustor 15 of a gas turbine with sequential combustion, in which on the left and right in each case a burner 9 which is adjacent to the parting plane 38 is deactivated and the remaining burners 9 are in operation.

Alternatively to the deactivating of burner sub-groups which is shown in FIGS. 8a/b, starting from high load, during which all the burners 9 are in operation, individual burners 9 can also be deactivated. First of all, as shown in FIG. 9a, only a burner 9 which is adjacent to the parting plane 38 and lying on the left in the direction of view is deactivated. In the next step, a burner 9 which is adjacent to the parting plane 38 and lying on the right in the direction of view is deactivated.

Additional burners 9 can be deactivated in turn inversely proportionally to the load.

Figure 10:
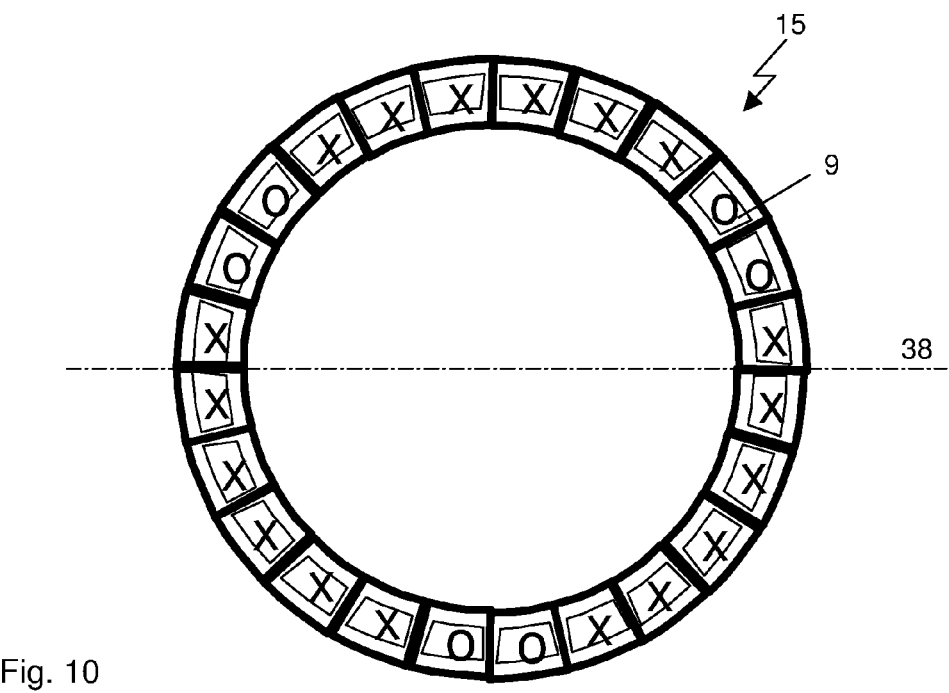
FIG. 10 shows a cross section through the second combustor of a gas turbine with sequential combustion, in which three groups of burners are deactivated and the remaining burners are in operation.

FIG. 10 shows a cross section through the second combustor 15 of a gas turbine with sequential combustion, in which three groups of burners 9 are deactivated and the remaining burners 9 are in operation. Such a configuration can be selected, for example, when the influence of leakages at the parting plane 38 upon the CO emissions is little and also the influence of deactivated, cold adjacent burners upon the CO emissions of the activated burners 9 is little. An advantage of this arrangement is the relatively homogenous temperature profile at the exit of the combustor 15.

Figure 11:
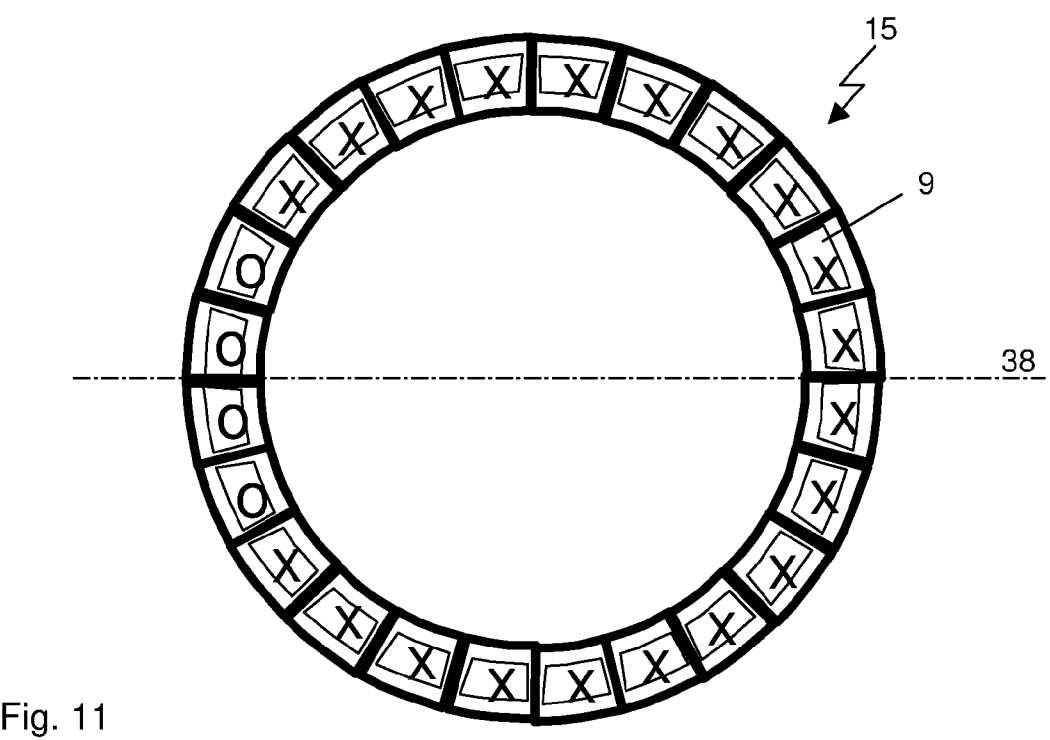
FIG. 11 shows a cross section through the second combustor of a gas turbine with sequential combustion, in which one group of burners is deactivated and the remaining burners are in operation.

FIG. 11 shows a cross section through the second combustor 15 of a gas turbine with sequential combustion, in which only one group of burners 9 is deactivated and the remaining burners 9 are in operation. This arrangement is advantageous if the influence of deactivated, cold adjacent burners upon the CO emissions of the activated burners 9 is very large and the poor exit temperature profile—which ensues in the process—of the combustor 15 of the subsequent second turbine 12 can be tolerated or the cooling can be adapted to the temperature profile.

All the explained advantages are not limited just to the specified combinations but can also be used in other combinations or alone without departing from the scope of the invention. Other possibilities are optionally conceivable, for example, for deactivating individual burners 9 or groups of burners 9.

List of Designations
1 Compressor
2 Intake air
3 Compressed air
4 First combustor
5 Fuel feed
6 Hot gases
7 First turbine
8 Partially expanded hot gases
9 Burner of second combustor
10 Fuel feed
11 Hot gases
12 Second turbine
13 Exhaust gases (for the waste heat boiler)
14 Variable compressor inlet guide vanes
15 Second combustor
16 Low-pressure cooling-air control valve
17 Carrier-air control valve
18 Shaft
19 Generator
21 High-pressure cooling-air control valve
22 High-pressure cooling air
23 Cooling air
24 Carrier air
25 Anti-icing control valve
26 Anti-icing line
27 Individual control valve
28 Fuel control valve
29 Fuel feed
30 Fuel ring main
31 Fuel ring main for first sub-group
32 Fuel ring main for second sub-group
33 Fuel control valve for first sub-group
34 Fuel control valve for second sub-group
35 High-pressure cooling-air cooler
36 Low-pressure cooling-air cooler
37 Individual on/off valve
38 Parting plane
TAT Turbine exhaust temperature
TAT1 Turbine exhaust temperature of the first turbine
TAT2 Turbine exhaust temperature of the second turbine
TIT Turbine inlet temperature
TIT1 Turbine inlet temperature of the first turbine
TIT2 Turbine inlet temperature of the second turbine
$P_{rel}$ Relative load
X Activated burner
O Deactivated burner While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for the low-CO emissions operation of a gas turbine with sequential combustion, wherein the gas turbine includes a first turbine, a second turbine, at least one compressor wherein the at least one compressor includes a row of variable compressor inlet guide vanes, a first combustor which is connected downstream to the compressor and the hot gases of which first combustor are admitted to the first turbine, and a second combustor which is connected downstream to the first turbine and the hot gases of which are admitted to the second turbine, the second combustor including operative burners each having an air ratio ($\lambda$), the method comprising:

maintaining the air ratio ($\lambda$) of the operative burners of the second combustor below a maximum air ratio ($\lambda_{max}$);

with a load increase, before operating the second combustor, increasing a turbine inlet temperature (TIT1) to a part load limit, and opening the row of variable compressor inlet guide vanes; and when engaging the second combustor, closing the row of variable compressor inlet guide vanes and introducing fuel into the second combustor.

2. The method as claimed in claim 1, wherein the at least one compressor includes a row of variable compressor inlet guide vanes, the method further comprising:

when unloading, before disengaging the second combustor, closing the row of variable compressor inlet guide vanes; and again opening the row of variable compressor inlet guide vanes upon disengaging of the second combustor.

3. The method as claimed in claim 1, wherein the at least one compressor includes a row of variable compressor inlet guide vanes, the method further comprising:

when unloading the gas turbine, shutting down the second combustor only at a load below a load achieved during operation with the first combustor at a part load limit of the turbine inlet temperature of the first turbine (TIT1) and with the row of variable compressor inlet guide vanes open.

4. The method as claimed in claim 1, further comprising: shutting off a fuel feed to at least one burner of the second combustor at part load so that, with an unaltered turbine inlet temperature of the second turbine (TIT2), an air ratio ($\lambda$) of the burners in operation is reduced.

5. The method as claimed in claim 4, wherein:
the second combustor includes a parting plane; and shutting off a fuel feed to at least one burner of the second combustor at part load comprises first shutting off a fuel feed to at least one burner which is adjacent to the parting plane.

6. The method as claimed in claim 4, wherein shutting off a fuel feed to at least one burner of the second combustor at part load is performed so that the number of deactivated burners is inversely proportional to the load.

7. The method as claimed in claim 1, wherein the at least one compressor includes a row of variable compressor inlet guide vanes, the method further comprising:
increasing the part load limit of the turbine exhaust temperature of the first turbine (TAT1), of the second turbine (TAT2), or of both, for a part load range in order to shift the opening of the row of variable compressor inlet guide vanes to a higher load.

8. The method as claimed in claim 1, wherein the compressor comprises an air intake, the method further comprising:
expanding a partial flow of at least partially compressed compressor air to form an expanded partial flow; and
adding said expanded partial flow to the intake air.

9. The method as claimed in claim 1, further comprising:
controlling at least one cooling air temperature, at least one cooling air mass flow, or both, as a function of the load.

10. The method as claimed in claim 1, further comprising:
controlling the fuel temperature of the first combustor, of the second combustor, or of both, as a function of the load.

11. A gas turbine comprising:
a compressor with variable inlet guide vanes;
a first turbine;
a second turbine;
a first combustor connected downstream to the compressor such that hot gases from the first combustor are admitted to the first turbine; and
a second combustor connected downstream to the first turbine such that hot gases from the second combustor are admitted to the second turbine wherein the second combustor comprises a plurality of burners;
at least one fuel line leading to the plurality of burners; and
an individual on/off valve or an individual control valve arranged in at least one fuel line to control individual burners.

12. The gas turbine as claimed in claim 11, wherein:
the combustor has a parting plane; and
the individual on/off valve or the individual control valve is arranged in a fuel line adjacent to the parting plane.

13. The gas turbine as claimed in claim 11, wherein the compressor is configured and arranged for a pressure ratio which is higher than that required for reliable operation at full load.

14. The gas turbine as claimed in claim 11, further comprising:
turbine exhaust and exhaust gas lines from the second turbine, the turbine exhaust and exhaust gas lines being configured and arranged for a turbine exhaust temperature of the second turbine which is higher than the maximum full-load exhaust gas temperature.

15. A gas turbine comprising:
a compressor;
a first turbine;
a second turbine;
a first combustor connected downstream to the compressor such that hot gases from the first combustor are admitted to the first turbine;
a second combustor connected downstream to the first turbine such that hot gases from the second combustor are admitted to the second turbine wherein the second combustor comprises a plurality of burners, the plurality of burners comprising at least first and second burner sub-groups; and
a fuel distribution system including a first fuel control valve and a first fuel ring main configured and arranged to distribute fuel to burners of the first burner sub-group, and at least one second fuel control valve and at least one second fuel ring main configured and arranged to distribute fuel to burners of the second sub-group.

16. The gas turbine as claimed in claim 15, wherein the compressor is configured and arranged for a pressure ratio which is higher than that required for reliable operation at full load.

17. The gas turbine as claimed in claim 16, further comprising:
turbine exhaust and exhaust gas lines from the second turbine, the turbine exhaust and exhaust gas lines being configured and arranged for a turbine exhaust temperature of the second turbine which is higher than the maximum full-load exhaust gas temperature.

* * * * *